(12) United States Patent
Doucet et al.

(10) Patent No.: US 8,192,695 B2
(45) Date of Patent: Jun. 5, 2012

(54) REACTOR APPARATUS HAVING REDUCED BACK MIXING

(75) Inventors: Laurent Doucet, Pierre-Bénite (FR); Philippe Tanguy, Outremont (CA); Doug Berti, Houston, TX (US); Thanh Nguyen, Sugar Land, TX (US); Guillaume Franc, Levallois Perret (FR); Jay Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 1875 days.

(21) Appl. No.: 11/121,795

(22) Filed: May 4, 2005

(65) Prior Publication Data

US 2006/0251554 A1    Nov. 9, 2006

(51) Int. Cl.
*B01J 19/00* (2006.01)
*B01J 19/18* (2006.01)
*B01J 8/02* (2006.01)

(52) U.S. Cl. ........ 422/224; 422/129; 422/131; 422/135; 422/211; 422/223; 422/225

(58) Field of Classification Search .......... 422/129, 422/131, 135, 211, 223–225
See application file for complete search history.

(56) References Cited

U.S. PATENT DOCUMENTS

| | | | |
|---|---|---|---|
| 3,945,976 A | 3/1976 | McCurdy et al. ...... 260/33.6 AQ | |
| 4,013,542 A * | 3/1977 | Gudelis et al. .................. 208/33 | |
| 4,049,729 A | 9/1977 | Otto et al. ................. 260/654 H | |
| 4,058,652 A | 11/1977 | Smith et al. ...................... 526/68 | |
| 4,214,063 A | 7/1980 | Luallin ............................. 526/68 | |
| 4,222,986 A | 9/1980 | Smith et al. .................... 422/133 | |
| 4,334,826 A * | 6/1982 | Connolly et al. .............. 416/185 | |
| 4,460,278 A * | 7/1984 | Matsubara et al. ............ 366/149 | |
| 4,496,753 A | 1/1985 | Kwon et al. .................... 549/521 | |
| 4,609,752 A * | 9/1986 | Giesing et al. ................. 556/457 | |
| 4,675,377 A * | 6/1987 | Mobley et al. ................. 528/215 | |
| 4,748,268 A | 5/1988 | Pietsch et al. ................. 560/205 | |
| 4,804,794 A * | 2/1989 | Ver Strate et al. ............... 585/12 | |
| 4,985,208 A * | 1/1991 | Sugawara et al. ............. 422/135 | |
| 5,145,255 A * | 9/1992 | Shimada et al. ......... 366/325.92 | |
| 5,167,449 A * | 12/1992 | Killough ........................ 366/247 | |
| 5,210,172 A | 5/1993 | van Hout et al. .............. 528/196 | |
| 5,612,219 A * | 3/1997 | Rodicio et al. ............. 435/301.1 | |
| 5,756,592 A | 5/1998 | Bedwell et al. ................ 525/390 | |
| 6,265,511 B1 | 7/2001 | Campbell et al. .............. 526/336 | |
| 6,399,739 B1 | 6/2002 | McCloskey et al. .......... 528/196 | |

* cited by examiner

*Primary Examiner* — Walter D Griffin
*Assistant Examiner* — Natasha Young (57) ABSTRACT

Disclosed is a reactor or sparging vessel suitable for use for reaction mixtures containing vapor and/or gas bubbles. It comprises a mechanical agitation means suitable to redistribute flow radially and at least one perforated plate suitable to provide resistance to axial flow. In desirable embodiments it may include at least one electrically or hydraulically-stimulated rotatable shaft upon which at least one blade impeller is mounted, and at least one perforated plate oriented such that it provides resistance to axial flow. The perforated plate may have channels therethrough whose cross-sectional dimension is smaller than the projected average diameter of the vapor and/or gas bubbles. The reactor or sparging vessel offers improved flow dynamics, including reduced back mixing and narrowed residence time distribution. A method of employing the reactor for a reaction mixture containing vapor and/or gas bubbles is also disclosed. An impeller blade having two curvatures is also disclosed.

15 Claims, 8 Drawing Sheets

REACTOR APPARATUS HAVING REDUCED BACK MIXING

BACKGROUND OF THE INVENTION

1. Field of the Invention

The invention relates to reactions wherein vapor and/or gas bubbles are produced and rising in a fluid. More particularly, the invention relates to reactions wherein autorefrigeration or sparging is employed.

2. Background of the Art

A number of known reactions may be characterized as including a vapor phase. Some of these reactions involve introduction of a gas through a means such as a sparger. These gases may include, for example, air, oxygen or nitrogen. Other reactions are those categorized as autorefrigeration reactions. In these reactions a solvent-diluent medium is vaporized from a liquid phase in order to remove the exothermic head of reaction and maintain a substantially constant temperature in the medium remaining in solution. In these cases the vaporized solvent-diluent is usually recovered via, for example, a condenser, and the recovered solvent-diluent is returned to the reactor. This solvent-diluent may be a single material such as toluene; a constant boiling azeotrope such as benzenecyclohexane, or a reactant in the system. Temperature control in these cases thus requires a vapor space in the reaction vessel into which the vaporized solvent-diluent medium expands. Some of the solution medium is frequently entrained in the vapor phase and must then be removed separately because it may foul the solvent-diluent vapor removal means.

When either of the above-described types of reactions is carried out in conventional autorefrigeration or sparging vessels, the rising vapor and/or gas bubbles induce significant axial, or back, mixing. Such mixing tends to broaden the residence time distribution, and may also undesirably affect the product being produced. The residence time within these types of vessels is therefore generally comparable to that of continuous stirred tank reactors (CSTRs).

In view of the above, it would be desirable to have an autorefrigerated reactor or sparging vessel wherein back mixing is reduced and, therefore, residence time distribution may be narrowed.

SUMMARY OF THE INVENTION

A method for reducing the back mixing of a reaction mixture including vapor and/or gas bubbles has now been found. It includes carrying out the desired reaction in a reactor or sparging vessel comprising at least one mechanical agitation means suitable to redistribute flow radially and at least one perforated plate oriented to resist axial flow. The combination of the specified mechanical agitation means and the perforated plate serves to narrow bubble size distribution and reduce back mixing.

A reactor or sparging vessel comprising at least one mechanical agitation means suitable to redistribute flow radially, and at least one perforated plate oriented to resist axial flow, is also disclosed.

Finally, the invention includes a reactor or sparging vessel suitable for use for reaction mixtures containing vapor and/or gas bubbles. This reactor or sparging vessel comprises a downward-directed flow inlet and flow outlet, at least one electrically or hydraulically-stimulated rotatable shaft upon which at least one blade impeller is mounted, and at least one perforated plate statically or movably disposed within the reactor. The perforated plate has channels whose cross-sectional dimension is smaller than the projected average diameter of the vapor and/or gas bubbles. In this reactor or sparging vessel, the electrically or hydraulically-stimulated rotatable shaft is suitable to rotate the blade impeller within the reaction mixture such that flow is redistributed radially, and the perforated plate is suitable to provide resistance to axial flow. The result is that back mixing may be reduced.

DETAILED DESCRIPTION OF INVENTION

The invention provides a reactor/vessel design that may be generally characterized as offering reduced residence time distribution by addressing, and reducing, the effect of the back-mixing that results from a combination of axial flow and the formation, or introduction, and rising of vapor and/or gas bubbles. As used herein, the term "reactor/vessel" refers to a reactor, a sparging vessel, or both, according to the context within which it is used. Such bubbles may be artificially produced, by operation at a temperature whereby a given component of the reaction nears or reaches the boiling point for that component, such as in autorefrigerated reactors; or they may be the result of the reaction itself, such as when oxygen, carbon dioxide, hydrogen or another gas are formed; or they may be introduced via a sparging means, which may be used to incorporate a gas reactant, to modify viscosity, or for any other reason.

The back-mixing greatly reduces the efficiency of flow in a given reaction system. The inventive reactor design offers the advantage of facilitating what is termed herein as "quasi plug flow". This term refers to flow that, because of the geometry of the vessel and actual flow rate, does not meet precise definitions of plug flow, but which may approximate the desirable mixing level and inherently low back mixing features of plug flow. This is accomplished in the invention through a combination of agitation of the reactants, inducing radial flow and mixing, along with resistance to axial flow of vapor and/or gas bubbles and some portion of their entraining liquid.

The agitation of the reactants may be accomplished by any means known to those of ordinary skill in the art. In general such means may constitute mechanical flow facilitators, such as the use of blade impellers or other "stirring" means which increase the mixing of the reactants and, importantly, promote radial flow, i.e., flow toward the perimeter of the reactor. These means may also serve to induce shear, which may concomitantly reduce viscosity and thereby also may enhance the reaction and decrease the bubble size, which may therefore increase the residence time. Where blade impellers are selected they are typically deployed on one or more rotating shafts. Desirably, in one embodiment, the electrically or hydraulically-stimulated rotation may occur at a rate ranging from about 10 to about 100 rpm (0.2 to 2 ft/min (6 to 61 cm/min), more desirably from about 15 to about 60 rpm (0.3 to 1.2 ft/min (9 to 36 cm/min). Routine engineering design and modeling may be used to determine size and blade configurations as well as the operating speed that may be useful to optimize flow. Such blade impeller may be employed singly or multiply, depending upon the size and geometry of both blade impeller(s) and reactor/vessel, and may conveniently be paired. They are typically manufactured from metals or alloys, such as stainless steel, but may also be prepared from polymers or composite material. Optimal fabrication materials will depend upon the selected reactants, reaction products, and conditions under which the reaction will be carried out.

A key in reducing the back-mixing that may be induced or enhanced by the rising vapor and/or gas bubbles is the use of perforated plates. As used herein, the term "perforated plate" refers to a solid three-dimensional construct as to which two dimensions are at least several times, and desirably many times, the third dimension, and having segregated channels (perforations) axial to that third dimension that represent a significant volume of the construct as a whole. In some embodiments this means that the height and length of a plate, which may be, for example, a rectangular or approximately rectangular structure, or the diameter of a substantially circular plate, is much greater than the thickness of the plate, and that the channels (perforations) desirably represent at least about 5 percent, more desirably at least about 10 percent, and most desirably at least about 15 percent, of the total surface area of the plate.

The channels themselves may present in cross-section any of a variety of configurations, e.g., round, square, rectangular, etc., but their cross-sectional dimension is desirably selected to be less than the average diameter of the vapor and/or gas bubbles in the reaction mixture. For example, where routine engineering, modeling, monitoring and/or observation suggest that the average vapor bubble diameter throughout the reaction mixture is about 1.5 cm, it is desirable that the average cross-sectional dimension of the channels (perforations) be less than that, and more desirably at least about 50 percent less. Those skilled in the art will understand that many parameters may need to be taken into account when modeling is applied, and may include factors such as viscosity, agitation rate, reactor geometry, flow and reaction rates, sparging means and rate, and the like. It will be appreciated that a variety of channel sizes may be incorporated in one plate, or that more than one plate may be used with each having one or more discretely sized channels.

Figure 1:
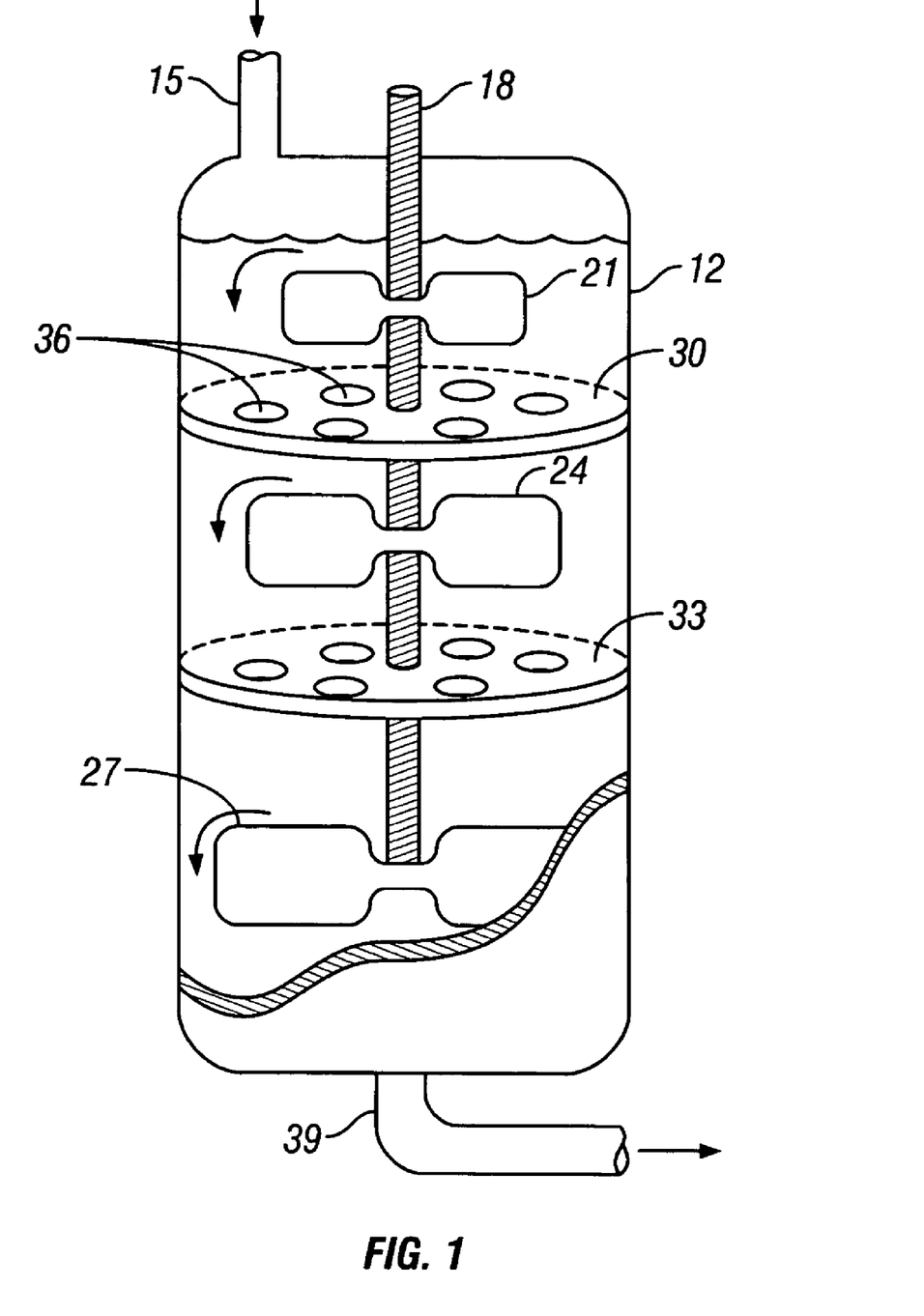
FIG. 1 is a partial cross-section of a reactor having disposed therein an impeller assembly and, affixed to the reactor wall, perforated plates.

The perforated plates may be disposed within the reactor in a variety of orientations. However, they are desirably disposed in such a way as to provide resistance to axial flow. This means that they will desirably be oriented, whether statically or movably, such that axial flow (which, because of the radial flow-inducing effect of the mechanical agitation means, tends to be more predominantly counter-current flow) is directed toward the perforated plate's larger or largest dimension surface and therefore impliedly through its channels. In other words, the perforated plate's surface is desirably substantially perpendicular to the direction of such axial flow. In one embodiment this may be promoted by shaft-mounting the perforated plate or plates and rotating it/them at the same speed as the impellers. In fact, in some embodiments the plates may be mounted on the same shafts as the blade impellers. In other embodiments the plate or plates may be disposed in permanent, or static, positions within the reactor or vessel, in orientations where routine engineering design indicates flow will be axial or approximately axial. For example, the plate or plates may be disposed in a substantially cylindrical reactor with their circumferences affixed to the reactor wall. One desirable embodiment is shown in FIG. 1, wherein the rotatable shaft, upon which a series of paired blade impellers are mounted, is centrally and axially disposed, and passes through a series of perforated plates which are circumferentially affixed to the reactor wall, with each plate occupying essentially the entire diameter of the reactor.

In still other embodiments, the plates may be disposed in locations where gas flow relative to them will not be truly axial or approximately axial; however, this embodiment may result in a greater level of undesirable back mixing and therefore broadened residence time distribution.

In one embodiment it may be desirable to artificially "sectionalize" the reactor/vessel into more than one agitation "zone". This may be accomplished by using a series of mechanical agitation means disposed within the reactor/vessel, as well as a corresponding series of perforated plates.

The inventive reactor design is suitable for use in a wide variety of applications. For example, it may be used for reactors for preparing polymers such as polystyrene, high impact polystyrene, styrene-butadiene, polymethylmethacrylate, polyamines, acrylonitrile-butadiene-styrene, styrene-acrylonitrile, combinations thereof, and the like. In one embodiment, it is used for fermentation for the production of biopolymers. As will be obvious to those skilled in the art, it is thus possible to have one reactant, such as a monomer which is being polymerized to form a homopolymer, or more than one reactant, such as two or more monomers which are being used to prepare a copolymer. It is also possible to include a gas sparger to incorporate a gas, as a reactant or as a process modifier, into a reactor into which at least one liquid reactant is being flowed. The products produced using the inventive reactor or sparging vessel may then be employed in uses ranging from manufacture of, for example, durable goods such as furnishings, toys, housings, automobile parts, films, and the like, to disposable goods such as food containers and packaging in general.

FIG. 1 illustrates one embodiment of the inventive reactor/vessel. In this drawing the reactor/vessel 12 is fed by reactant inlet 15. Flow of the reactants is indicated by the arrows. Disposed within the reactor/vessel 12 is a rotatable shaft 18. Mounted on the rotatable shaft 18 are paired sets of impeller blades 21, 24 and 27, respectively, which are aligned with the vertical axis of the reactor/vessel 12. When the blades are rotated, this orientation will facilitate radial flow while minimizing axial flow in general. In the embodiment illustrated in this FIG. 1, the lengths of the blade impellers are "stepped", such that the paired blade impellers 21 closest to the inlet 15 have the shortest length, and the paired blade impellers 27 farthest from the inlet have the greatest length. Also disposed within the reactor, and circumferentially affixed thereto, are two approximately circular perforated plates 30 and 33. These perforated plates 30 include channels (perforations) 36 thereihrough. The rotatable shaft 18 is operated via electrical or hydraulic-stimulation to an appropriate mechanical means (not shown) disposed outside of reactor/vessel 12.

In use the desired reactant or reactants may be flowed, via reactant inlet 15, into reactor/vessel 12, where the rotating impeller blades 21, 24 and 27 operate to direct flow radially while at the same time the overall flow pressure from the inlet 15 generally establishes current flow toward the outlet 39. In this "outward and downward" flow path the reactants, and therefore the entrained vapor and/or gas bubbles, pass through the two perforated plates 30 and 33, and eventually to the outlet 39. Back mixing is reduced because counter-current flow, induced by the natural tendency of the vapor and/or gas bubbles to rise in what is essentially a counter-current, or back, flow, is axially hindered by the plates 30 and 33, and those vapor and/or gas bubbles that do rise to reach the plates 30 and 33 become, or already are, reduced in size due to passing through the plate perforations 26. This size reduction itself tends to reduce associated flow turbulence and therefore also contributes to desirably decreased back mixing. The gas is also redistributed radially by the motion of 24 between 30 and 33, and the bubbles are reduced in size by the energy dissipated by 24. As a consequence, the gas residence time is increased.

In one embodiment, the invention includes an impeller that has been designed to provide near plug flow behavior in single phase fluids and to provide efficient gas dispersions in mixed phase fluids. This can be accomplished by reducing downward flow while optimizing the mixing of the phases. The impellers may have more or fewer blades, but desirably have from 3 to 5 blades. In one embodiment, the impellers have four blades.

Figure 3A:
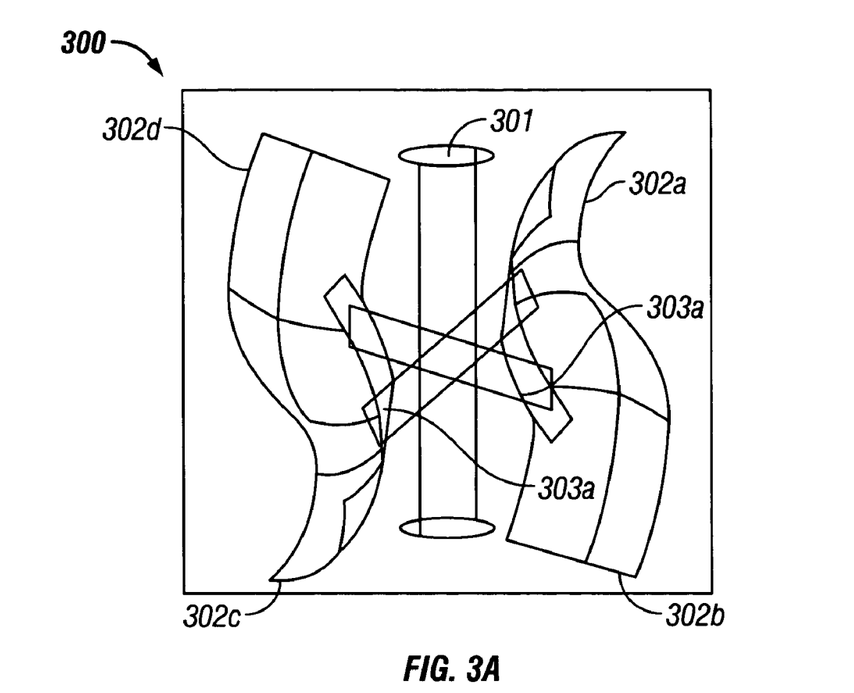
FIG. 3A is a transparent graphical illustration of a perspective view of a 4 bladed impeller having a blade pitch angle of 0°.
Figure 3B:
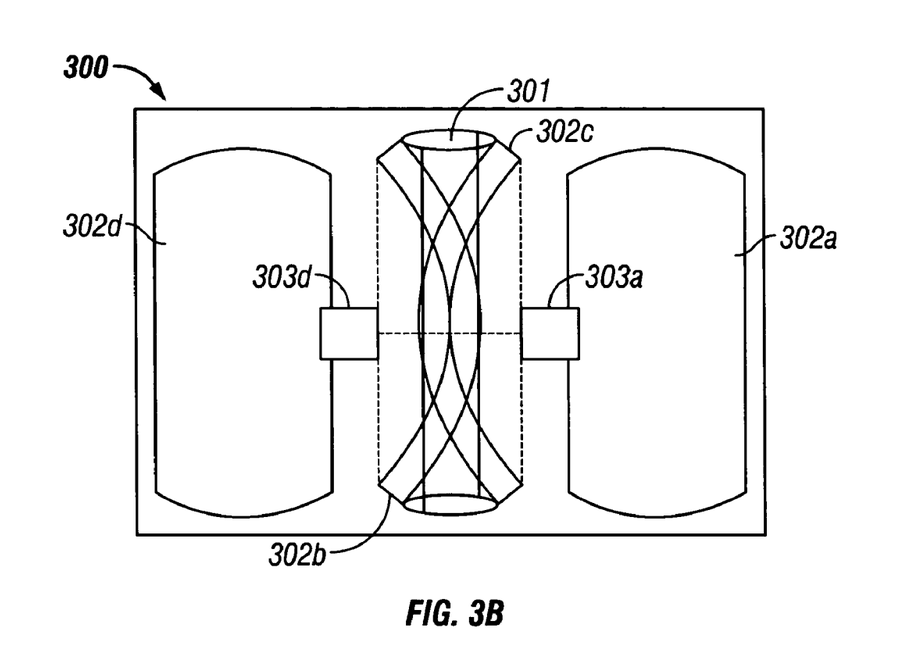
FIG. 3B is a transparent graphical illustration of a side view of a 4 bladed impeller having a blade pitch angle of 0°.
Figure 3C:
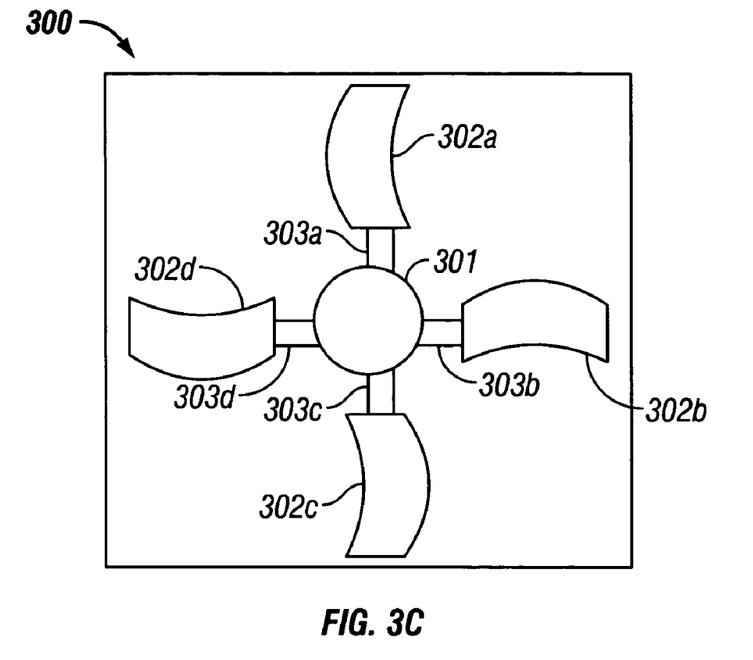
FIG. 3C is a transparent graphical illustration of a top view of a 4 bladed impeller having a blade pitch angle of 0°.
Figure 4A:
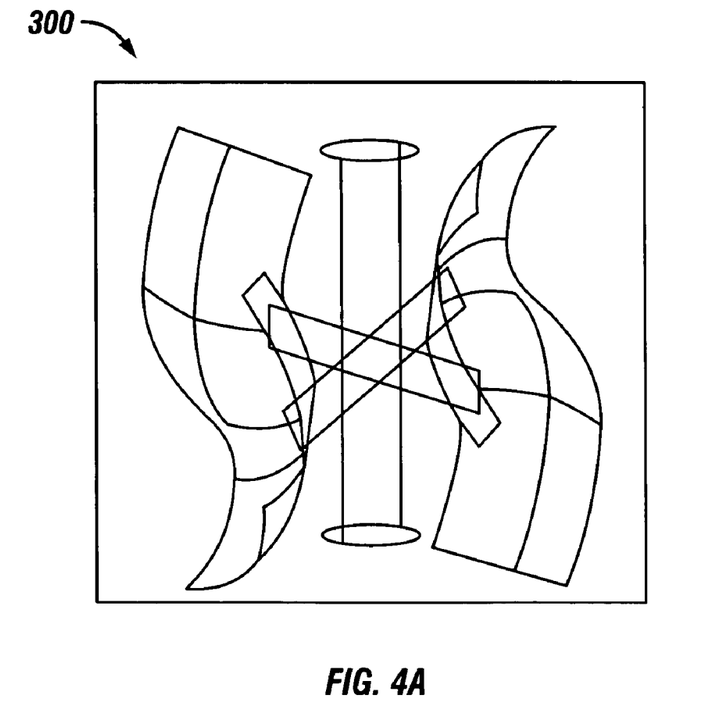
FIG. 4A is a transparent graphical illustration of a perspective view of a 4 bladed impeller having a blade pitch angle of 30°.
Figure 4B:
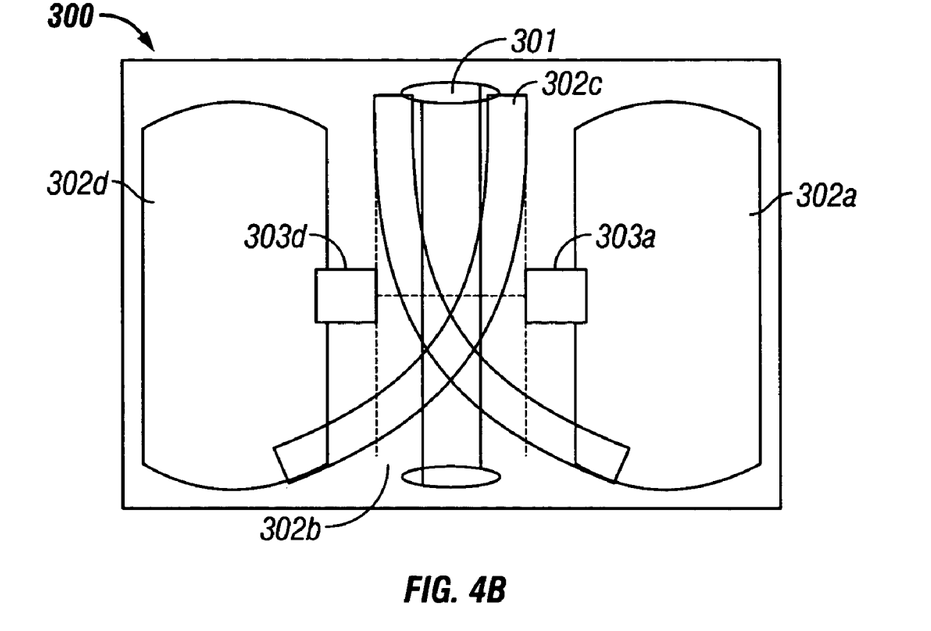
FIG. 4B is a transparent graphical illustration of a side view of a 4 bladed impeller having a blade pitch angle of 30°.
Figure 4C:
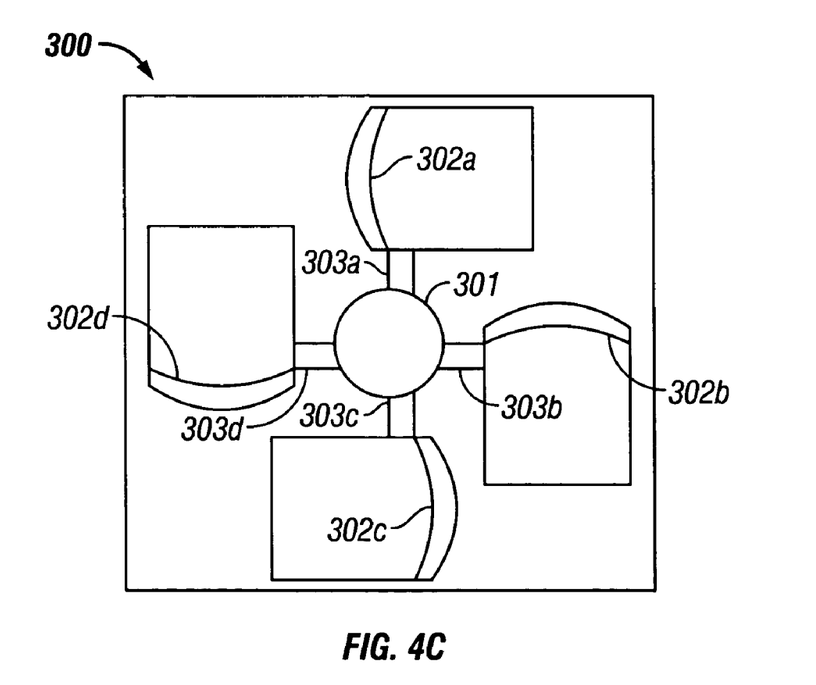
FIG. 4C is a transparent graphical illustration of a top view of a 4 bladed impeller having a blade pitch angle of 30°.
Figure 5A:
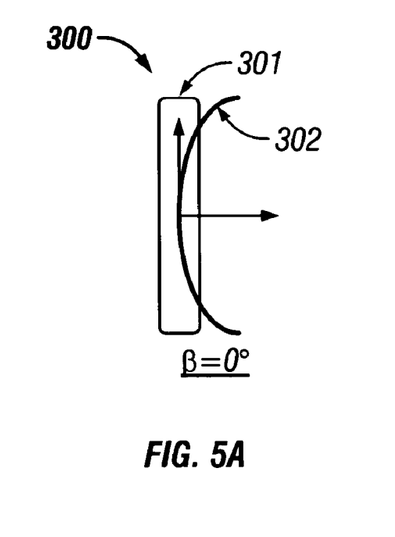
FIG. 5A is a schematic illustration of a blade having a blade pitch angle of 0°.
Figure 5B:
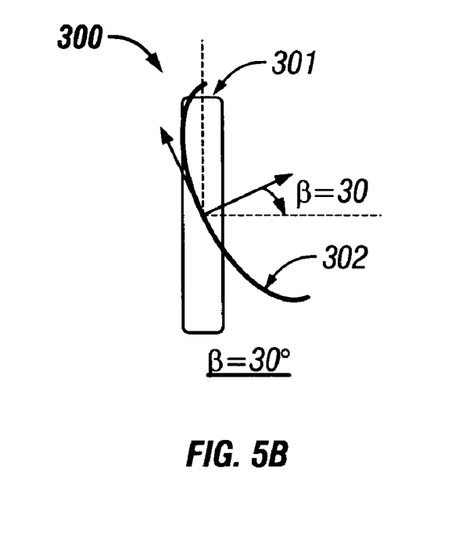
FIG. 5B is a schematic illustration of a blade having a blade pitch angle of 30°.

The blades of the impeller may be configured to optimize the mixing of multiple phases. FIGS. 3A-C show three views of a four bladed impeller having the blades in a 0.degree. blade pitch configuration. In these figures, the impeller 300 has a shaft, 301. On the shaft are up to four blade connectors 303a-d, connecting four blades 302a-d to the shaft 301. In contrast, FIGS. 4A-C shows the same impeller having the blades in a 30.degree. blade pitch configuration. These two configurations are further illustrated in FIGS. 5A and 5B wherein the pitch angle of the blade 302 is shown to be 0.degree. and 30.degree. respectively. The impeller may have a blade pitch of from 0.degree. to about 60.degree. In one embodiment, the impeller has a blade pitch of from 20.degree. to about 55.degree. In another embodiment, the impeller has a blade pitch of from 25.degree. to about 45.degree.

Figure 6:
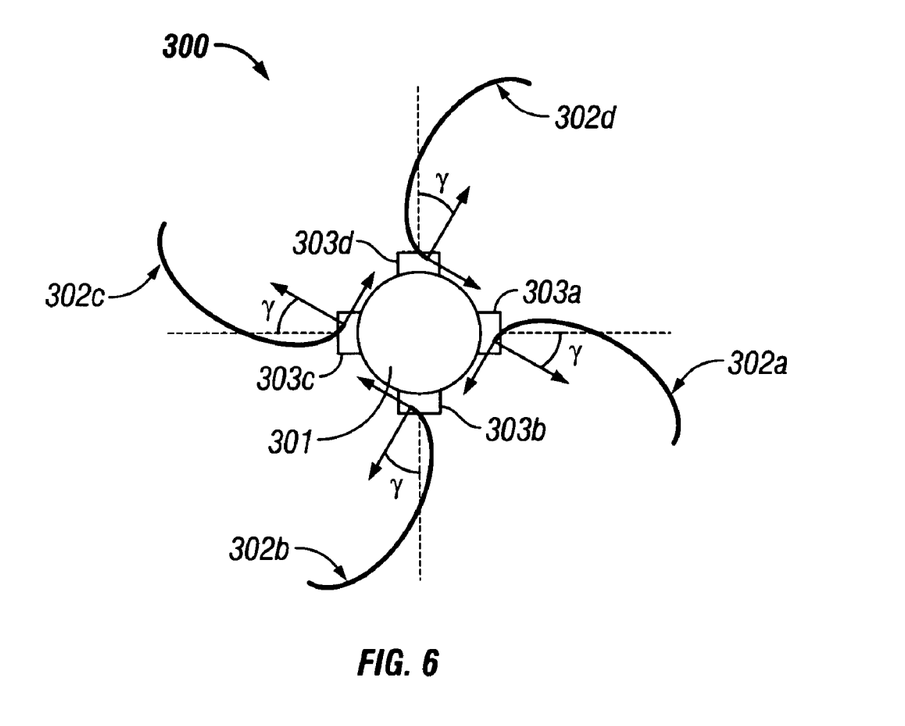
FIG. 6 is a schematic illustration of an impeller having the blades swept 30°.

In addition to blade pitch, the impellers can be adjusted to vary the degree the blades are swept relative to the shaft. In FIG. 6, an impeller 300 is shown in a top view wherein 301 is the shaft, 302a-d are blades, and 303a-d are blade connectors. In this configuration, the blades are show swept in 30° relative to the shaft. The impellers may have the blades swept from 0° to 45°.

Figure 7:
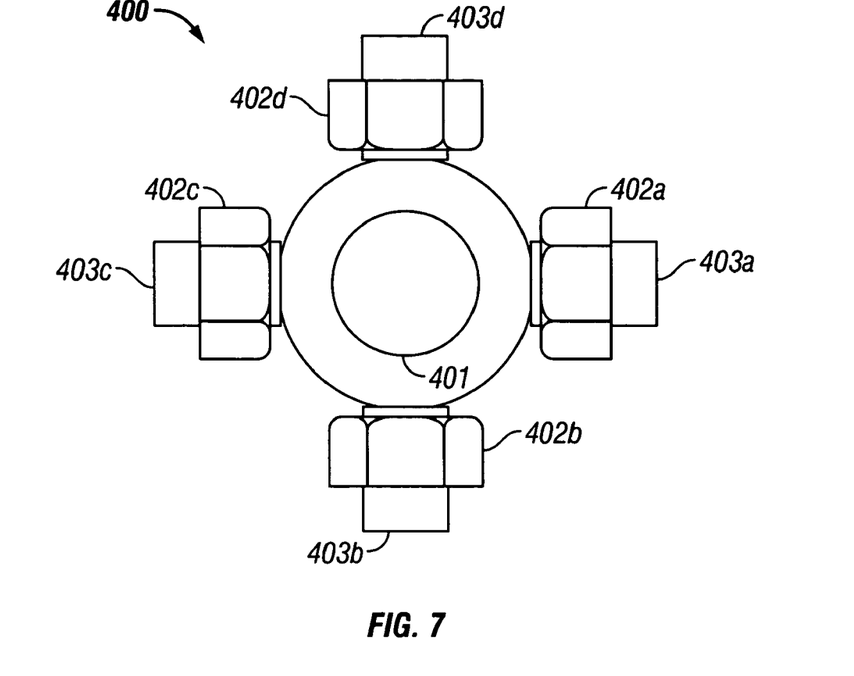
FIG. 7 is a schematic illustration of an impeller shaft and blade connectors.
Figure 8:
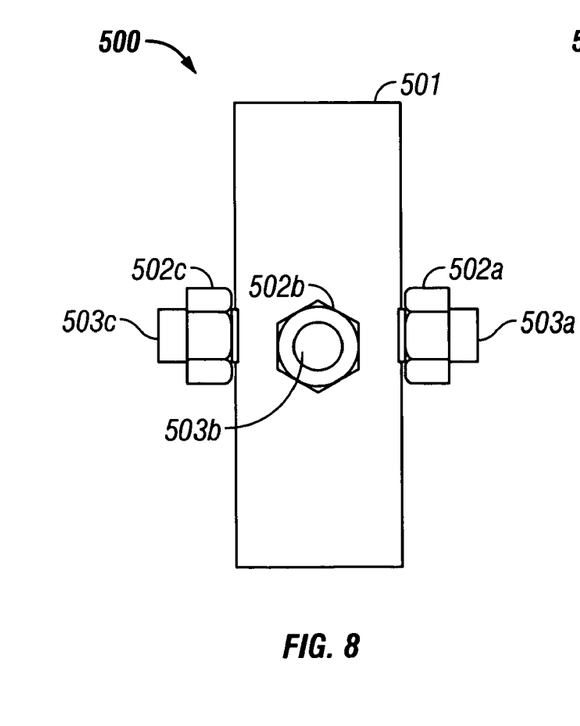
FIG. 8 is a side view of the illustration of FIG. 7.
Figure 9:
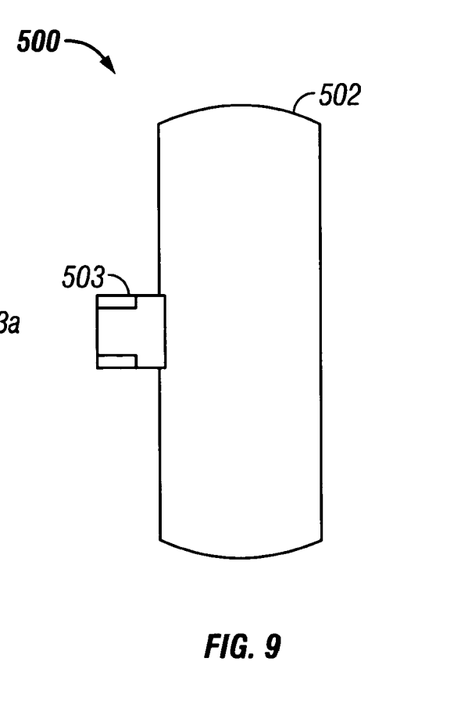
FIG. 9 Is a schematic illustration of an impeller blade and connector fitting.

FIG. 7 show one embodiment of attaching the blades of the impeller to the shaft. The blades may be attached using any method known to be useful to those of ordinary skill in the art. In FIG. 7, the impeller 400 is shown from a top view with the shaft 401 having attached thereto four connectors 403a-d and for hex nuts 402a-d. A side view is shown in FIG. 8 wherein the shaft 501 ahs three visible connectors 503a-d and three visible hex nuts 502a-c. In this embodiment, the connector fitting (FIG. 9, 504) on an impeller blade (FIG. 9, 301) is mated with the connector 503, the blade pitch adjusted to the desired point, and then the blade 301 is secured in place with the hexnut 502.

Figure 10:
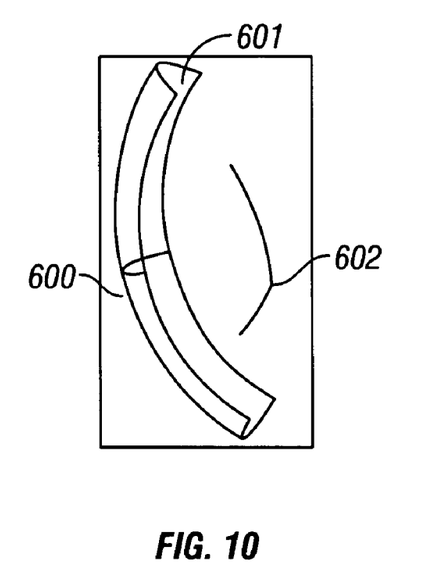
FIG. 10 is a schematic illustration of an impeller blade having a curvature.
Figure 11:
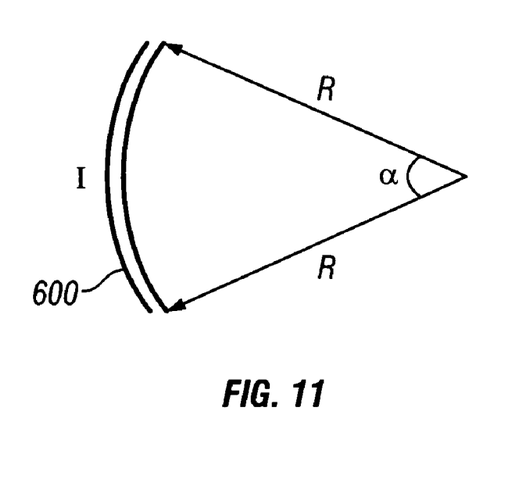
FIG. 11 is an illustration of the end on curvature of an impeller blade.

In FIG. 10, a blade 600 useful with the impeller is shown to have curvature in two perspectives. The blades are curved both when viewed end on 601 and from the side 602. These curvatures of the blades can be illustrated by example. In FIG. 11, the end on curvature of the blade 601 is defined by the radius of curvature at a given angle, alpha (α). The blades then have a radius of curvature defined by Table 1:

TABLE 1

| Impeller diameter | Radius of circle: R | Curves length: L | Angle: α |
|---|---|---|---|
| 6.75" | 1.5" | 2.29" | 45° |
| 5" | 1.125" | 1.73" | 45° |

Figure 12:
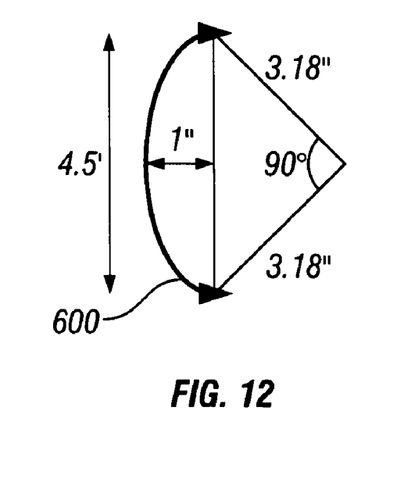
FIG. 12 is an illustration of the side curvature of an impeller blade.

In FIG. 12, the side curvature of a blade useful with the impeller is illustrated. In some embodiments, it may be necessary to increase the length of the blades as blade pitch is increased.

The impeller can be of any dimension suitable for use with the reactor in which it is to be installed. One of ordinary skill in the art of preparing reactors will be able to size the impeller.

EXAMPLES

The following hypothetical examples are provided for purposes of illustration. The examples are not intended to limit the invention's scope and should not be construed as such.

Example 1 and Comparative

A cylindrical reactor/vessel is constructed of stainless steel having the overall dimensions of 5 ft length×3 ft diameter. Disposed therein is a rotatable shaft having one set of paired blade impellers fabricated from stainless steel and having overall dimensions for each blade of 4 inches (10 cm) and 0.8 ml 0.02 mm) thickness. Disposed therein above the paired blade impellers is a perforated plate, with the rotatable shaft passing through the center of the perforated plate. The perforated plate is made of stainless steel and measures approximately 0.95 m in diameter by 1 cm in thickness, i.e., the plate crosses essentially the entire inner diameter of the reactor vessel. The plate is perforated by channels having a circular cross-section of approximately 3 cm. The blade impeller is located approximately 0.5 m above the bottom of the reactor/vessel.

A reaction is carried out in which styrene and a polybutadiene rubber solution are fed into the reactor/vessel. The rotatable shafts are rotated at approximately 20 rpm. The reacted product, which is styrene-butadiene, is flowed out of the outlet. Vapor and/or gas bubbles formed by the reaction are entrained in the reacted product. The average bubble diameter of the product at the outlet is found to be about 2 cm. This is approximately 50 percent less than that of bubbles formed under identical conditions wherein a rotatable shaft and impeller blade are disposed in the reactor/vessel, but wherein no perforated plates are employed. It is also found that the bubble size distribution is narrower in the example reactor/vessel than for the reactor/vessel without the perforated plates.

Example 2 and Comparative

Figure 2:
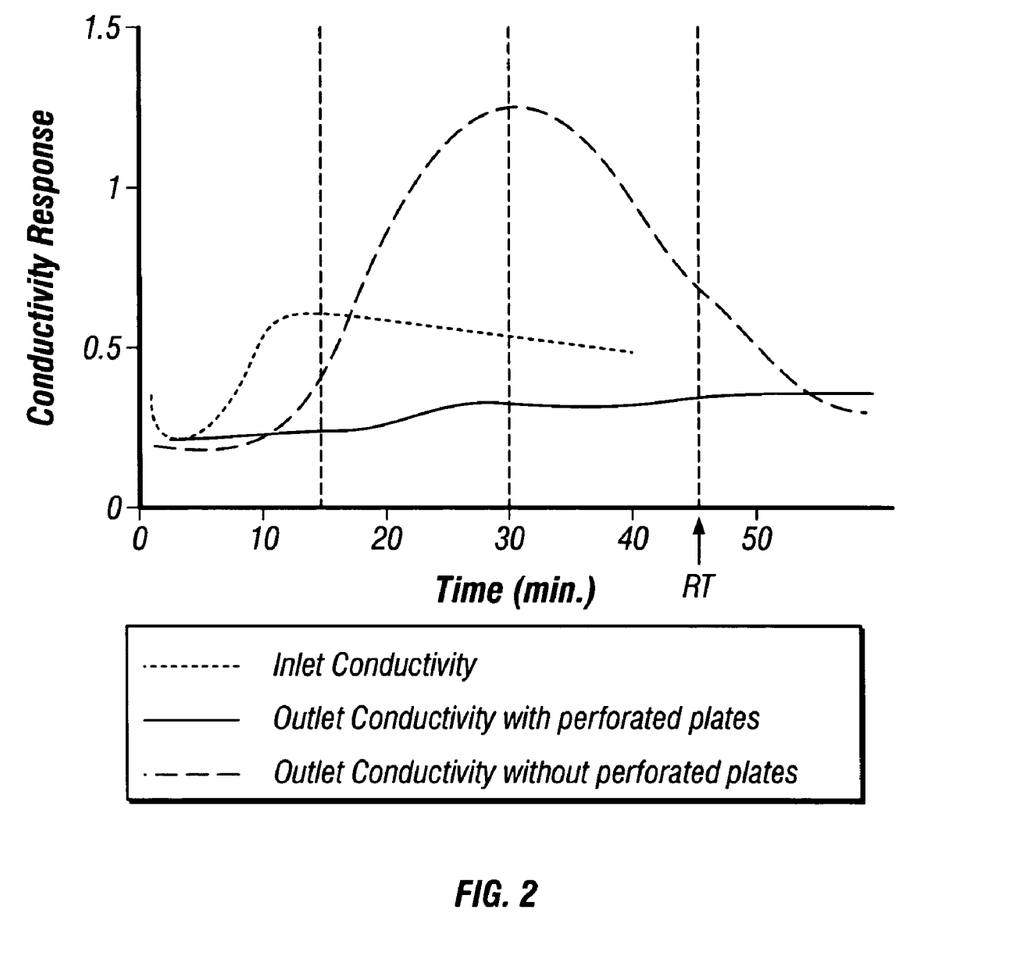
FIG. 2 is a graph showing the overall narrowing of residence time distribution attained by the inventive reactor/vessel as compared with a reactor/vessel without perforated plates.

A hypothetical experiment is carried out to determine residence time distribution for the inventive reactor/vessel as compared with a reactor/vessel without perforated plates. The reactor/vessel is as described in Example 1. Identical reactants are flowed into each reactor/vessel at a feed rate of 0.36 liters per minute, and with a gas flow rate of 20 liter per minute. Three sets of blade impellers, disposed as shown in FIG. 1, are rotated at a speed of about 50 rpm. The residence time of the reactants is measured using conductivity measurements respectively at the inlet and the outlet of the reactor/vessel. A negligible volume, compared to the reactor/vessel volume, of an electrically conductive liquid of the same viscosity, density and temperature as the reactants is injected during a negligible time, compared to the overall residence time, at the inlet of the reactor/vessel and is followed at the outlet of the reactor/vessel. The results are as shown in FIG. 2. In that figure it is seen that the overall residence time distribution achieved by the inventive reactor/vessel is considerably narrower, as shown by the relatively flat solid line, for the inventive reactor/vessel than for the comparative vessel, as shown by the broken line. The dotted line shows the inlet conductivity against which the residence time distributions may also be compared.

The description provided hereinabove is intended to generally describe the features and some useful embodiments of the invention. However, it will be appreciated that modifications may be made to many aspects of the invention without departing from its scope and generalized objects. For example, selection of temperatures, pressures, reactor vessel configurations, feed rates, fabrication materials, impeller configurations, rotation speeds, perforated plate configurations, plate orientations, and the like, not explicitly listed but which do not substantially alter the outcome of the process or the character of the products, will still fall within the scope of the invention.

What is claimed is:

1. A method for reducing the back mixing of a reaction mixture including vapor and/or gas bubbles in a polymerization reactor comprising configuring the polymerization reactor with at least one mechanical agitation means suitable to redistribute flow radially and at least one perforated plate oriented to resist axial flow;
    introducing styrene into the polymerization reactor under conditions sufficient to polymerize the styrene and form polystyrene; and
    withdrawing polystyrene from the polymerization reactor.

2. The method of claim 1 wherein the reactor is an autorefrigerated reactor.

3. The method of claim 1 wherein the mechanical agitation means is a blade impeller mounted on an electrically or hydraulically-stimulated rotatable shaft.

4. The method of claim 1 wherein the perforated plate is mounted on an electrically or hydraulically-stimulated rotatable shaft.

5. The method of claim 1 wherein the perforated plate and the blade impeller are both mounted on one electrically or hydraulically-stimulated rotatable shaft.

6. The method of claim 1 wherein the perforated plate is affixed to a wall of the reactor.

7. The method of claim 1 wherein the perforated plate has channels having a cross-sectional dimension that is smaller than the projected average diameter of the vapor and/or gas bubbles.

8. A method of carrying out a reaction with reduced back mixing comprising introducing at least one reactant into a polymerization reactor, the reactor being configured with at least one mechanical agitation means and at least one perforated plate, under reaction conditions such that the reaction mixture contains flowing vapor and/or gas bubbles, wherein the mechanical agitation means redistributes flow radially and the perforated plate provides resistance to axial flow, such that back mixing is reduced.

9. The method of claim 8 wherein the reactor is an autorefrigerated reactor.

10. The method of claim 8 wherein the mechanical agitation means is a blade impeller mounted on an electrically or hydraulically-stimulated rotatable shaft.

11. The method of claim 8 wherein the perforated plate is mounted on an electrically or hydraulically-stimulated rotatable shaft.

12. The method of claim 8 wherein the perforated plate and blade impeller are mounted on the same electrically or hydraulically-stimulated rotatable shaft.

13. The method of claim 8 wherein the perforated plate is affixed to a wall of the reactor/vessel.

14. The method of claim 8 wherein the perforated plate has channels having a cross-sectional dimension that is smaller than the average diameter of the vapor and/or gas bubbles prior to contact with, or passage through, the perforated plate.

15. The method of claim 8 wherein the average vapor bubble size after contact with, or passing through, the perforated plate is no more than 50 percent of the average vapor bubble size before contact with, or passing through, the perforated plate.

* * * * *